US00RE49462E

(19) United States
(12) Reissued Patent
Burenius et al.

(10) Patent Number: US RE49,462 E
(45) Date of Reissued Patent: Mar. 14, 2023

(54) ADAPTIVE NOISE CANCELLATION FOR MULTIPLE AUDIO ENDPOINTS IN A SHARED SPACE

(71) Applicant: Cisco Technology, Inc., San Jose, CA (US)

(72) Inventors: Lennart Burenius, Oslo (NO); Oystein Birkenes, Oslo (NO)

(73) Assignee: CISCO TECHNOLOGY, INC., San Jose, CA (US)

(21) Appl. No.: 17/325,875

(22) Filed: May 20, 2021

Related U.S. Patent Documents

Reissue of:
(64) Patent No.: 10,297,266
Issued: May 21, 2019
Appl. No.: 16/009,652
Filed: Jun. 15, 2018

(51) Int. Cl.

| | |
|---|---|
| ***G10L 21/0232*** | (2013.01) |
| ***H04R 3/04*** | (2006.01) |
| ***G10L 21/0208*** | (2013.01) |
| ***H04R 1/40*** | (2006.01) |
| *H04R 1/10* | (2006.01) |

(52) U.S. Cl.
CPC ..... *G10L 21/0232* (2013.01); *G10L 21/0208* (2013.01); *H04R 1/406* (2013.01); *H04R 3/04* (2013.01); *G10L 2021/02082* (2013.01); *H04R 1/1083* (2013.01); *H04R 2227/001* (2013.01); *H04R 2227/003* (2013.01); *H04R 2227/009* (2013.01); *H04R 2410/05* (2013.01)

(58) Field of Classification Search
None
See application file for complete search history.

(56) References Cited

U.S. PATENT DOCUMENTS 7,876,890 B2 1/2011 Diethom
8,488,745 B2 * 7/2013 Cutler ..... H04M 3/56 379/3
9,025,762 B2 5/2015 Bao et al.
(Continued)

OTHER PUBLICATIONS

Thubert, et al., "Virtual Noise Wall for Workspace Collaboration", ip.com, IPCOM000248272D, Cisco Systems, Inc., Nov. 14, 2016, 7 pgs.

(Continued)

*Primary Examiner* — John M Hotaling
(74) *Attorney, Agent, or Firm* — Edell, Shapiro & Finnan, LLC

(57) ABSTRACT

Techniques for adaptive noise cancellation for multiple audio endpoints in a shared space are described. According to one example, a method includes detecting, by a first audio endpoint, one or more audio endpoints co-located with the first audio endpoint at a first location. A selected audio endpoint of the one or more audio endpoints is identified as a target noise source. The method includes obtaining, from the selected audio endpoint, a loudspeaker reference signal associated with a loudspeaker of the selected audio endpoint and removing the loudspeaker reference signal from a microphone signal associated with a microphone of the first audio endpoint. The method also includes providing the microphone signal from the first audio endpoint to at least one of a voice user interface (VUI) or a second audio endpoint, wherein the second audio endpoint is located remotely from the first location.

24 Claims, 8 Drawing Sheets

(56) References Cited

U.S. PATENT DOCUMENTS

| | | | | |
|---|---|---|---|---|
| 9,241,016 | B2 | 1/2016 | Barth et al. | |
| 9,275,625 | B2 | 3/2016 | Kim et al. | |
| 9,319,633 | B1 | 4/2016 | Birkenes et al. | |
| 9,473,580 | B2 | 10/2016 | Barth et al. | |
| 9,591,148 | B2 | 3/2017 | Dimitroff et al. | |
| 9,799,330 | B2 | 10/2017 | Nemala et al. | |
| 9,877,114 | B2 * | 1/2018 | Sebastian | G01S 7/4815 |
| 9,913,026 | B2 | 3/2018 | Ahgren et al. | |
| 10,003,377 | B1 | 6/2018 | Ramalho et al. | |
| 10,089,067 | B1 * | 10/2018 | Abuelsaad | G10L 17/22 |
| 10,110,994 | B1 * | 10/2018 | Davis | H04R 1/406 |
| 10,141,973 | B1 | 11/2018 | Ramalho et al. | |
| 10,177,859 | B2 | 1/2019 | Barth et al. | |
| 10,277,332 | B2 | 4/2019 | Barth et al. | |
| 10,473,751 | B2 | 11/2019 | Birkenes | |
| 10,491,311 | B2 | 11/2019 | Barth et al. | |
| 10,491,995 | B1 | 11/2019 | Enstad et al. | |
| 10,530,417 | B2 | 1/2020 | Ramalho et al. | |
| 10,687,139 | B2 | 6/2020 | Enstad et al. | |
| 10,825,460 | B1 | 11/2020 | Ramalho et al. | |
| 2005/0207567 | A1 * | 9/2005 | Parry | H04M 9/08 379/406.01 |
| 2007/0237336 | A1 * | 10/2007 | Diethorn | H04R 1/1083 381/74 |
| 2008/0232569 | A1 * | 9/2008 | Diethorn | H04M 3/568 379/202.01 |
| 2009/0323925 | A1 * | 12/2009 | Sweeney | H04M 9/08 379/406.05 |
| 2013/0230152 | A1 * | 9/2013 | Frauenthal | H04B 3/23 379/27.03 |
| 2015/0117626 | A1 * | 4/2015 | Nord | H04M 3/568 379/202.01 |
| 2017/0346950 | A1 * | 11/2017 | Shaltiel | H04M 1/6033 |
| 2018/0077205 | A1 | 3/2018 | Fang et al. | |
| 2020/0059305 | A1 | 2/2020 | Barth et al. | |
| 2020/0116820 | A1 | 4/2020 | Birkenes | |
| 2020/0195297 | A1 | 6/2020 | Ramalho et al. | |
| 2022/0024484 | A1 * | 1/2022 | Armstrong-Crews | B60W 40/02 |
| 2022/0318860 | A1 * | 10/2022 | Dorch | G06V 40/161 |

OTHER PUBLICATIONS

Bao, et al., "Using an Ultrasound Signal for Clock and Timing Synchronization for Acoustic Echo Cancellation with Multiple Teleconference Devices in the Same Room", ip.com, IPCOM000247327D, Cisco Systems, Inc., Aug. 24, 2016, 16 pgs.

Widrow, et al., "Adaptive Noise Cancelling: Principles and Applications", Proceedings of the IEEE, vol. 63, No. 12, Dec. 1975, 27 pgs.

Tavakoli, et al., "A Framework for Speech Enhancement With Ad Hoc Microphone Arrays", IEEE/ACM Transactions on Audio, Speech and Language Processing, vol. 24, No. 6, Jun. 2016, 14 pgs.

Sakanashi, et al., "Speech enhancement with ad-hoc microphone array using single source activity", IEEE, Signal and Information Processing Association Annual Summit and Conference (APSIPA), Oct. 2013, 6 pgs.

* cited by examiner

ADAPTIVE NOISE CANCELLATION FOR MULTIPLE AUDIO ENDPOINTS IN A SHARED SPACE

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

TECHNICAL FIELD

The present disclosure relates to telecommunications audio endpoints.

BACKGROUND

Multiple audio endpoints may often be located in a shared space or common location. In these shared spaces, background noise caused by audio endpoints is often captured by the microphones of other audio endpoints at the common location. This background noise may then be transmitted to a far-end or remote audio endpoint that is participating in a telecommunication session with one of the audio endpoints. Receiving this background noise at the far-end can cause a loss of intelligibility and fatigue to participants in the telecommunication session.

DESCRIPTION OF EXAMPLE EMBODIMENTS

Overview

Figure 1:
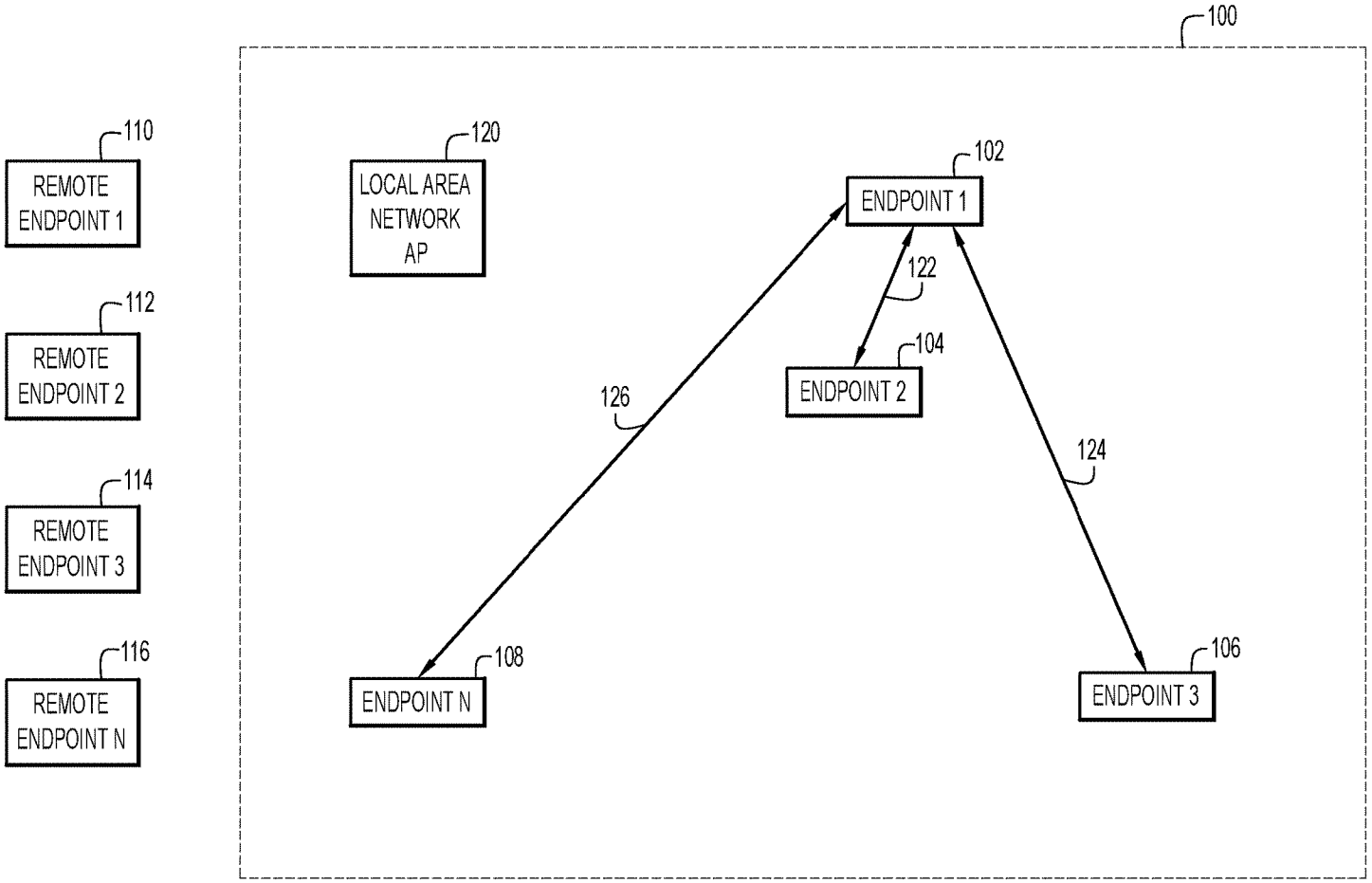
FIG. 1 is a diagram of a shared space including multiple audio endpoints in which techniques for adaptive noise cancellation may be implemented, according to an example embodiment.

Presented herein are techniques for implementing adaptive noise cancellation for multiple audio endpoints in a shared space. According to one example embodiment, a method of adaptive noise cancellation for multiple audio endpoints in a shared space includes detecting, by a first audio endpoint, one or more audio endpoints co-located with the first audio endpoint at a first location. The method also includes identifying a selected audio endpoint of the one or more audio endpoints as a target noise source and obtaining, from the selected audio endpoint, a loudspeaker reference signal associated with a loudspeaker of the selected audio endpoint. The method includes removing the loudspeaker reference signal from a microphone signal associated with a microphone of the first audio endpoint and providing the microphone signal from the first audio endpoint to at least one of a voice user interface (VUI) or a second audio endpoint, wherein the second audio endpoint is located remotely from the first location.

Example Embodiments

Noise pollution in an acoustically shared space, such as open offices or other common locations, can be caused by other people's conversations and/or by background noise from multiple audio endpoints or other devices being used within the same shared space at the same time. For example, hands-free communication devices, such as phones or video conferencing endpoints, may be used simultaneously in an acoustically shared space by different users on separate telecommunication sessions and devices may be operated within the shared space using voice user interfaces (VUIs), such as personal assistants or other voice-activated software or hardware.

Users within the acoustically shared space can use binaural cues to filter out other people's conversations and background noise to some extent. However, far-end or remote audio endpoint participants and many VUIs that listen to or receive the audio signals from a microphone of an audio endpoint in the shared space cannot use these binaural cues to filter out the noise pollution caused by the conversations and/or other noise in the background. As a result, the far-end or remote audio endpoint participants in a telecommunication session may experience bad speech comprehension caused by receiving an audio mix including the unrelated conversations and background noise, which can lead to a frustrating audio experience for these far-end or remote audio endpoint participants.

According to the principles of the present embodiments, techniques for implementing adaptive noise cancellation for multiple audio endpoints in a shared space are provided. With these techniques, audio signals provided to far-end or remote audio endpoint participants and/or to VUIs may be improved.

The example embodiments described herein provide techniques for adaptive noise cancellation across multiple devices or audio endpoints in an acoustically shared space to reduce the amount and extent of unwanted/unrelated background noise that is sent to far-end or remote audio endpoint participants and to improve the performance of VUIs.

FIG. 1 is a diagram of a shared space 100 including multiple audio endpoints in which techniques for adaptive noise cancellation may be implemented, according to an example embodiment. In an example embodiment, a plurality of audio endpoints may be co-located within an acoustically shared space 100. For example, acoustically shared space 100 may be an open office environment, a conference room, a public area, or other common location where multiple audio endpoints are physically present within acoustic proximity to each other. In this embodiment, shared space 100 includes a first audio endpoint 102, a second audio endpoint 104, a third audio endpoint 106, and additional audio endpoints up to an nth audio endpoint 108.

In some embodiments, one or more of the multiple audio endpoints 102, 104, 106, 108 may be engaged in separate telecommunication sessions with a remote audio endpoint or other far-end participant. In this embodiment, multiple remote audio endpoints, including a first remote audio endpoint 110, a second remote audio endpoint 112, a third remote audio endpoint 114, and up to an nth remote audio endpoint 116 are physically located remotely from shared space 100 and multiple audio endpoints 102, 104, 106, 108. That is, remote audio endpoints 110, 112, 114, 116 are not within acoustic proximity to audio endpoints 102, 104, 106, 108.

Audio endpoints, including any of audio endpoints 102, 104, 106, 108 and/or remote audio endpoints 110, 112, 114, 116, may include various types of devices having at least audio or acoustic telecommunication capabilities. For example, audio endpoints may include conference phones, video conferencing devices, tablets, computers with audio input and output components, electronic personal/home assistants, hands-free/smart speakers (i.e., speakers with voice controls), devices or programs controlled with VUIs, and/or other devices that include at least one speaker and at least one microphone.

In an example embodiment, an audio endpoint in shared space 100, for example, first audio endpoint 102, may implement techniques for adaptive noise cancellation to remove background noise associated with one or more of the other audio endpoints (e.g., second audio endpoint 104, third audio endpoint 106, and/or nth audio endpoint 108) that are also co-located within shared space 100. In one embodiment, first audio endpoint 102 detects one or more audio endpoints that are co-located with first audio endpoint 102 within shared space 100 and are connected to a common local area network (LAN). For example, audio endpoints 102, 104, 106, 108 may communicate with each other, remote audio endpoints 110, 112, 114, 116, or any other devices by accessing LAN through a LAN access point (AP) 120. LAN access point 120 may provide a connection to a network, such as the internet, public switched telephone network (PSTN), or any other wired or wireless network, including LANs and wide-area networks (WANs), to permit audio endpoints 102, 104, 106, 108 to engage in a telecommunication session.

In one embodiment, the presence of other audio endpoints within shared space 100 may be detected or determined by first audio endpoint 102 using an ultrasonic signal obtained from one or more of the other audio endpoints (e.g., second audio endpoint 104, third audio endpoint 106, and/or nth audio endpoint 108). For example, audio endpoints 104, 106, 108 may transmit or provide an ultrasonic proximity signal that broadcasts each audio endpoint's Internet Protocol (IP) address in the high-frequency audio spectrum (e.g., above 16-17 kHz). As shown in FIG. 1, first audio endpoint 102 may receive a first ultrasonic signal 122 from second audio endpoint 104, a second ultrasonic signal 124 from third audio endpoint 106, and a third ultrasonic signal 126 from nth audio endpoint 108.

In some embodiments, each audio endpoint 102, 104, 106, 108 may use an ultrasonic encoding technique that permits multiple concurrent broadcasts or using a "first-come, first-serve" method to transmit its ultrasonic signal to other endpoints to locate each of audio endpoints 102, 104, 106, 108 in shared space 100. In other embodiments, detecting or locating each of audio endpoints 102, 104, 106, 108 in shared space 100 may be set up manually.

Once each of audio endpoints 102, 104, 106, 108 has been detected or located within shared space 100, clock-synchronization and a low-delay LAN connection may be established between one or more of audio endpoints 102, 104, 106, 108. For example, as shown in FIG. 1, first audio endpoint 102 may synchronize clocks and establish a low-delay LAN connection with each of second audio endpoint 104, third audio endpoint 106, and/or nth audio endpoint 108. The network delay may be short compared to the acoustical delay in shared space 100. Clock synchronization between the analog-to-digital (ADC) and digital-to-analog (DAC) converters associated with the audio transducers inside each of audio endpoints 102, 104, 106, 108 may be accomplished according to known techniques. For example, using Precision Time Protocol (PTP) standard defined by Institute of Electrical and Electronics Engineers (IEEE) 1588 and/or Audio Video Bridging (AVB) and Time Synchronized Networking (TSN) standards, the specifications of which standards are hereby incorporated by reference in their entirety.

After detecting each of the other audio endpoints in shared space 100 and setting up clock synchronization and the low-delay LAN connection, first audio endpoint 102 may next identify a selected audio endpoint as a target noise source, as will be described in more detail below. In some embodiments, computational network resources may be limited. Accordingly, a method 200 of detecting audio endpoints in shared space 100 and identifying a target noise source may be used to select the audio endpoint associated with the worst or highest anticipated noise level may be used. In other embodiments, however, where additional computational network resources are available, additional audio endpoints may be identified as target noise sources for adaptive noise cancellation techniques according to the example embodiments described herein.

Figure 2:
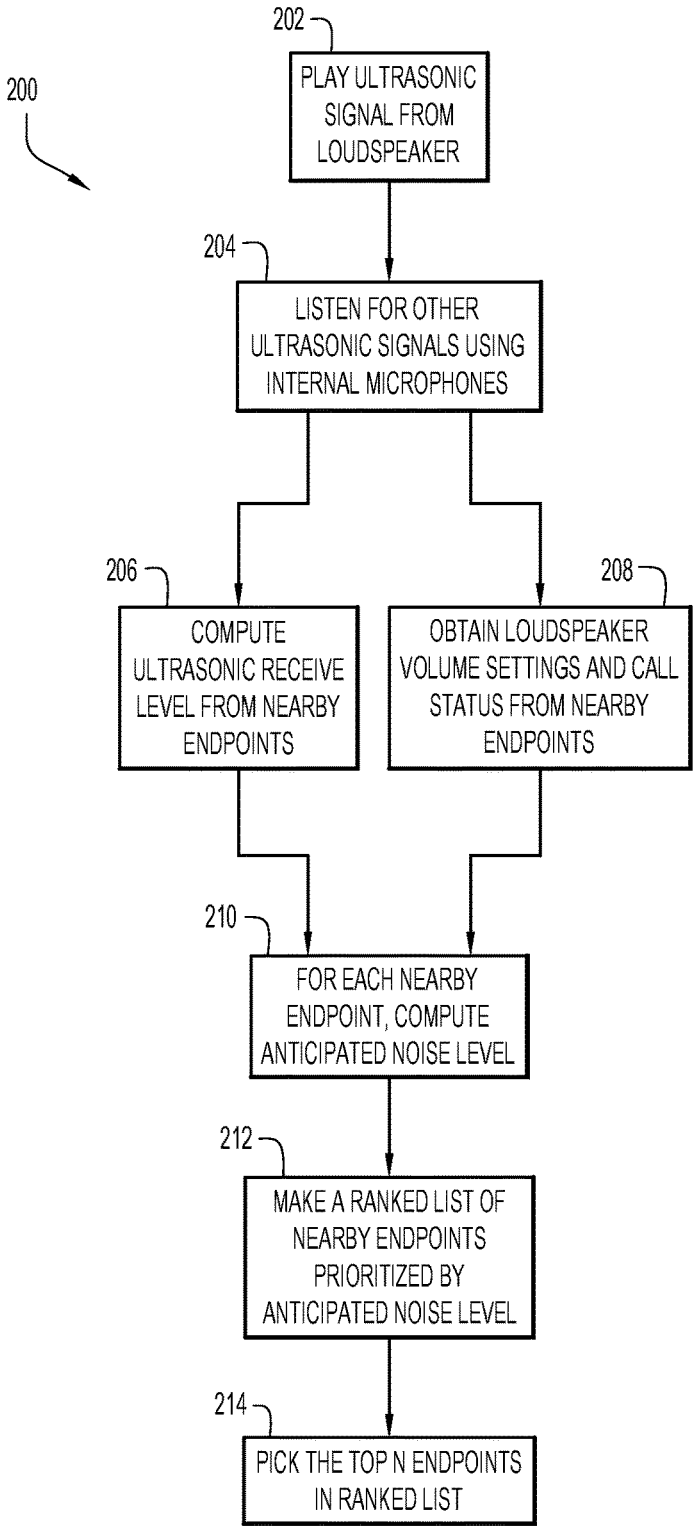
FIG. 2 is a flowchart of a method of locating audio endpoints in a shared space and identifying a target noise source, according to an example embodiment.

Referring now to FIG. 2, a flowchart of method 200 of detecting audio endpoints in shared space 100 and identifying a target noise source is illustrated according to an example embodiment. In this embodiment, method 200 may begin at an operation 202 where each audio endpoint in shared space 100 plays or emits an ultrasonic signal from its loudspeaker. Next, at an operation 204, a subject audio endpoint (e.g., first audio endpoint 102) listens or obtains other ultrasonic signals from one or more of the other audio endpoints (e.g., second audio endpoint 104, third audio endpoint 106, and/or nth audio endpoint 108) in shared space 100 using its microphone.

After operation 204, first audio endpoint 102 may establish low-delay LAN connections with each detected audio endpoint, for example, second audio endpoint 104, third audio endpoint 106, and/or nth audio endpoint 108. Optionally, in some embodiments, first audio endpoint 102 may also establish clock synchronization with each detected audio endpoint. Method 200 may proceed to operations 206, 208 to obtain information for determining associated noise levels of each of the detected audio endpoints. For example, the information may be obtained from operation 206 where first audio endpoint 102 determines an ultrasonic signal receive level (i.e., a higher receive level indicates a closer proximity to first audio endpoint 102) for each located audio endpoint (e.g., second audio endpoint 104, third audio endpoint 106, and/or nth audio endpoint 108). The information may also be obtained from operation 208 where loudspeaker volume settings and/or call status (i.e., whether or not an audio endpoint is currently participating in a telecommunication session) is obtained by first audio endpoint 102 for each of the other audio endpoints 104, 106, 108.

At an operation 210, first audio endpoint 102 may compute or determine an anticipated noise level for each other audio endpoint 104, 106, 108. Anticipated noise level may be determined using a variety of factors and/or information obtained from each other audio endpoint 104, 106, 108. For example, some of the factors and/or information that may be used by first audio endpoint 102 to determine the anticipated noise levels include: the ultrasonic signal receive level (e.g., obtained from operation 206), metadata obtained over the low-delay LAN connections (e.g., loudspeaker volume settings, call status, and other signal levels obtained from operation 208), cross-correlations of received microphone signals with local microphone signals, and distance and/or direction information (e.g., which may be obtained using triangulation techniques from a microphone array).

Based on this information, method 200 may proceed to an operation 212 where first audio endpoint 102 may assemble or determine a ranked list of detected audio endpoints 104, 106, 108 that is prioritized based on the determined anticipated noise levels from operation 210. For example, audio endpoints having higher anticipated noise levels are ranked higher on the list than those with lower anticipated noise levels.

At an operation 214, first audio endpoint 102 picks or selects one or more of the audio endpoints associated with the highest ranked anticipated noise levels from operation 212. For example, at operation 214, first audio endpoint 102 may identify a selected audio endpoint associated with the highest ranked anticipated noise level from operation 212 as a target noise source for the purposes of implementing techniques for adaptive noise cancellation to remove background noise associated with the selected audio endpoint.

In one embodiment, a single audio endpoint may be selected as being associated with the worst or highest anticipated noise level for adaptive noise cancellation. In other embodiments, however, two or more audio endpoints may be identified as selected audio endpoints associated with target noise sources for adaptive noise cancellation. For example, audio endpoints associated with an anticipated noise level that exceeds a predetermined threshold may be identified as selected audio endpoints associated with target noise sources for adaptive noise cancellation.

Figure 3:
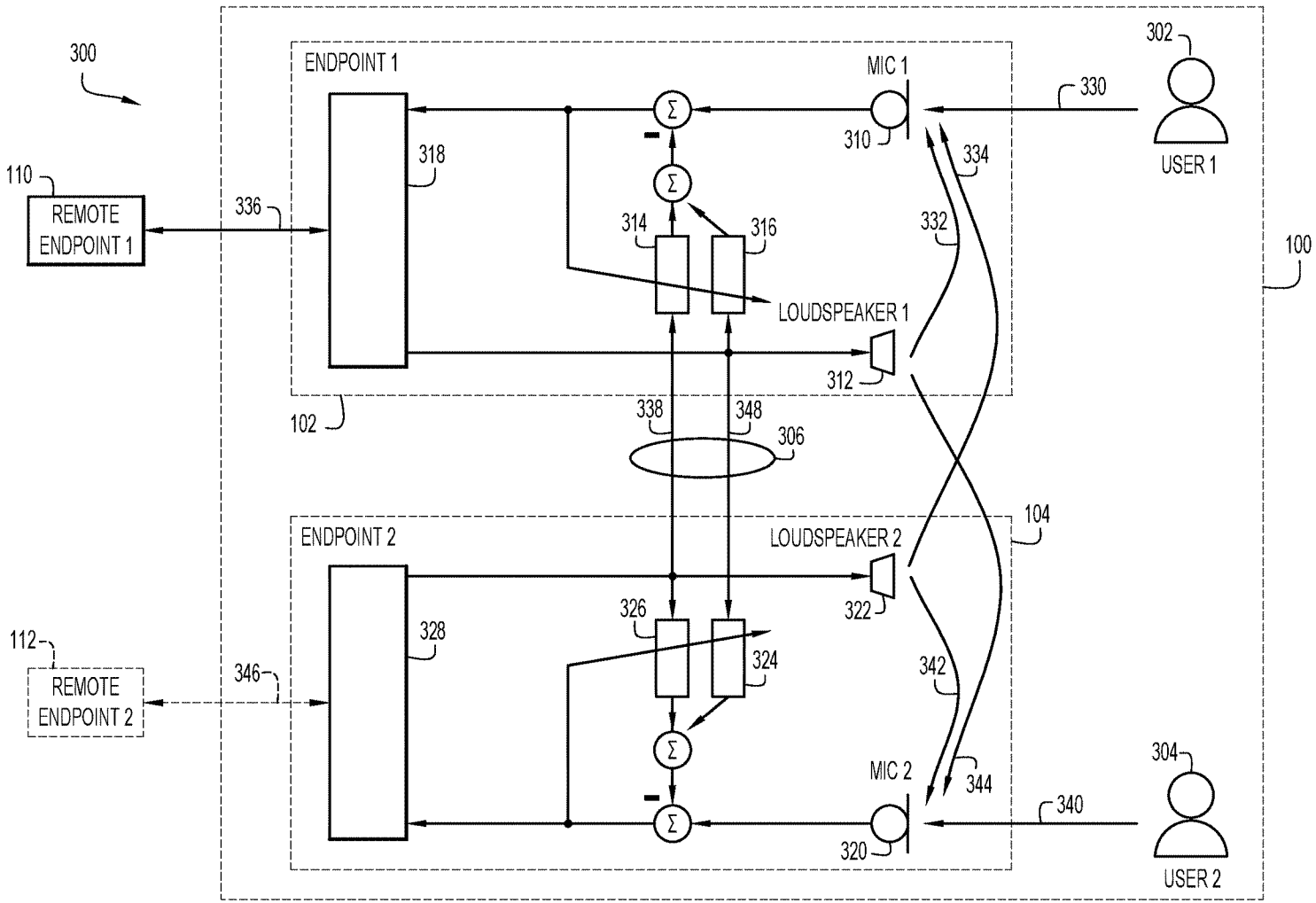
FIG. 3 is a diagram illustrating a technique for implementing adaptive noise cancellation for multiple audio endpoints in a shared space, according to an example embodiment.

Referring now to FIG. 3, a technique 300 for implementing adaptive noise cancellation for multiple audio endpoints in shared space 100 is shown according to an example embodiment. In this embodiment, two audio endpoints (e.g., first audio endpoint 102 and second audio endpoint 104) are shown in acoustically shared space 100. A first user 302 is using first audio endpoint 102 to engage in a telecommunication session with a first remote audio endpoint 110. Simultaneously within shared space 100, a second user 304 is using second audio endpoint 104 to engage in a separate audio or acoustical session that is independent from the telecommunication session between first audio endpoint 102 and first remote audio endpoint 110.

For example, second user 304 may be using second audio endpoint 104 to engage in a separate telecommunication session with a different remote audio endpoint, such as second remote audio endpoint 112. Second user 304 may alternatively or additionally be using second audio endpoint 104 to engage in some other type of separate audio or acoustical session. For example, second user 304 may be receiving calls or messages on second audio endpoint 104 that generate a ringtone, playing music on a loudspeaker associated with second audio endpoint 104, and/or may be communicating with a VUI embedded or in communication with second audio endpoint 104.

Within shared space 100, first audio endpoint 102 and second audio endpoint 104 are both connected to a network (e.g., a LAN via LAN AP 120, shown in FIG. 1) to allow communication with other devices and/or participants. Additionally, as previously described above, first audio endpoint 102 and second audio endpoint 104 may be connected to each other via a low-delay LAN connection 306. LAN connection 306 allows first audio endpoint 102 and second audio endpoint 104 to exchange various information. In this example, first audio endpoint 102 includes a microphone 310, a loudspeaker 312, and one or more signal processing components, including a first adaptive filter 314, a second adaptive filter 316 that is part of an acoustic echo cancellation (AEC) module 410 (shown in FIG. 4), and a signal decoder/encoder 318. Second audio endpoint 104 has a similar configuration, including a microphone 320, a loudspeaker 322, and one or more signal processing components, including a first adaptive filter 324, a second adaptive filter 326 that is part of an AEC module, and a signal decoder/encoder 328.

Technique 300 for implementing adaptive noise cancellation for audio endpoints in shared space 100 may be described with reference to first audio endpoint 102. In this embodiment, microphone 310 of first audio endpoint 102 is receiving inputs from several different audio sources within shared space 100. For example, microphone 310 receives a first audio input 330 from first user 302 who is using first audio endpoint 102 to conduct a telecommunication session with first remote audio endpoint 110. In this example, first audio input 330 is the intended audio content that first user 302 is providing to first remote audio endpoint 110 via a transmitted microphone signal 336. Microphone 310 also picks up or receives echo and/or noise from other audio sources within shared space 100, including an echo source 332 output from loudspeaker 312 of first audio endpoint 102 and a first noise source 334 output from loudspeaker 322 of second audio endpoint 104.

The example embodiments presented herein provide a technique of implementing adaptive noise cancellation to remove these additional unwanted noise sources from microphone signal 336 provided to first remote audio endpoint 110 from first audio endpoint 102. In this embodiment, first audio endpoint 102 may implement adaptive noise cancellation of first noise source 334 output from loudspeaker 322 of second audio endpoint 104 by obtaining from second audio endpoint 104 a loudspeaker reference signal 338 that may then be removed from the microphone signal associated with microphone 310 of first audio endpoint 102 using first adaptive filter 314. As shown in FIG. 3, first audio endpoint 102 receives or obtains loudspeaker reference signal 338 from second audio endpoint 104 via low-delay LAN connection 306. In this embodiment, loudspeaker reference signal 338 is the audio signal provided from signal decoder 328 of second audio endpoint 104 that is to be output from loudspeaker 322. For example, loudspeaker reference signal 338 may be based on received audio signals from second remote audio endpoint 112.

At first audio endpoint 102, loudspeaker reference signal 338 is removed from the microphone signal associated with microphone 310 of first audio endpoint 102 using first adaptive filter 314. That is, loudspeaker reference signal 338 corresponds to first noise source 334 output from loudspeaker 322 of second audio endpoint 104 and picked up by microphone 310 of first audio endpoint 102. With this arrangement, first adaptive filter 314 uses loudspeaker reference signal 338 to remove the contribution of first noise source 334 from the microphone signal associated with microphone 310 of first audio endpoint 102 before microphone signal 336 is provided or transmitted to first remote audio endpoint 110.

Additionally, in some embodiments, first audio endpoint 102 may further include second adaptive filter 316 that removes the contribution of echo source 332 from the microphone signal associated with microphone 310 of first audio endpoint 102 before microphone signal 336 is provided or transmitted to first remote audio endpoint 110.

Technique 300 for implementing adaptive noise cancellation for audio endpoints in shared space 100 may also be described with reference to second audio endpoint 104. That is, each audio endpoint in shared space 100 may implement adaptive noise cancellation to remove noise sources from the other audio endpoints within shared space 100. For example, microphone 320 of second audio endpoint 104 receives inputs from a first audio input 340 from second user 304 who is using second audio endpoint 104 to conduct a separate telecommunication or other audio/acoustical session with second remote audio endpoint 112. In this example, first audio input 340 is the intended audio content that second user 304 is providing to second remote audio endpoint 112 via a transmitted microphone signal 346. As in the previous example, microphone 320 also picks up or receives echo and/or noise from other audio sources within shared space 100, including an echo source 342 output from loudspeaker 322 of second audio endpoint 104 and a first noise source 344 output from loudspeaker 312 of first audio endpoint 102.

At second audio endpoint 104, a loudspeaker reference signal 348 is provided from first audio endpoint 102 via LAN connection 306. Loudspeaker reference signal 348 corresponds to first noise source 344 output from loudspeaker 312 of first audio endpoint 102 and picked up by microphone 320 of second audio endpoint 104. This loudspeaker reference signal 348 is removed from the microphone signal associated with microphone 320 of second audio endpoint 104 using first adaptive filter 324. Additionally, in some embodiments, second audio endpoint 104 may further include second adaptive filter 326 that removes the contribution of echo source 342 from the microphone signal associated with microphone 320 of second audio endpoint 104 before microphone signal 346 is provided or transmitted to second remote audio endpoint 112.

Figure 4:
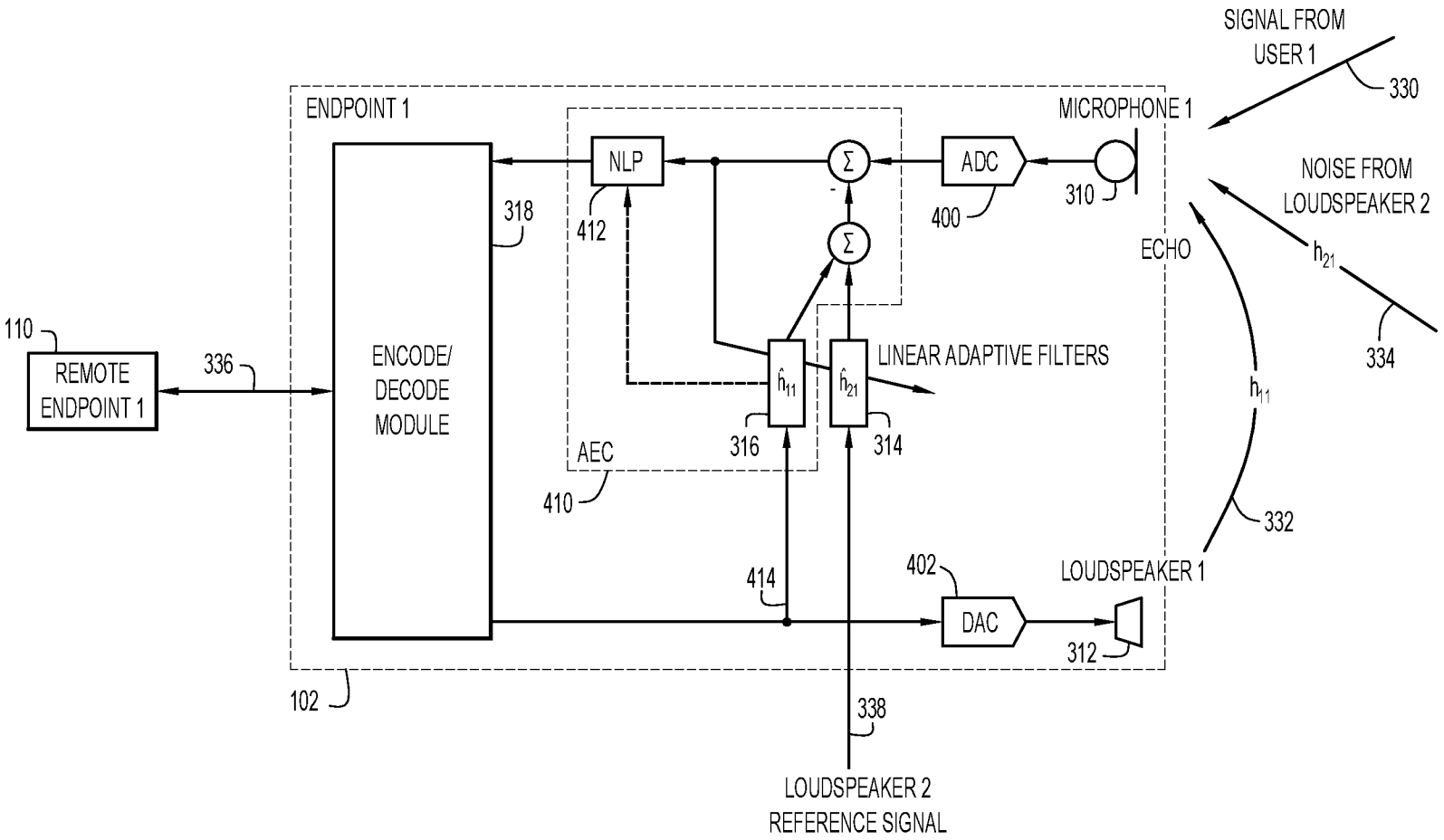
FIG. 4 is a diagram illustrating a technique for implementing adaptive noise cancellation at an audio endpoint, according to an example embodiment.

Referring now to FIG. 4, a simplified representative diagram illustrates technique 300 for implementing adaptive noise cancellation at first audio endpoint 102, according to an example embodiment. As described above, microphone 310 of first audio endpoint 102 is associated with a microphone signal that includes multiple components from different audio sources. In this embodiment, the microphone signal includes first audio input 330 from first user 302, echo source 332 ($h_{11}$) output from loudspeaker 312 of first audio endpoint 102, and first noise source 334 ($h_{21}$) output from loudspeaker 322 of second audio endpoint 104. The microphone signal from microphone 310 is then provided to an analog-to-digital converter (ADC) 400.

As shown in FIG. 4, the digital microphone signal from ADC 400 passes to first adaptive filter module 314, which removes first noise source 334 ($h_{21}$) from the microphone signal using loudspeaker reference signal 338 that is obtained from second audio endpoint 104 via LAN connection 306. Additionally, second adaptive filter module 316 removes echo source 332 ($h_{11}$) from the microphone signal from loudspeaker 312 of first audio endpoint 102. Second adaptive filter module 316 may remove echo source 332 using a corresponding loudspeaker reference signal (414) from loudspeaker 312 of first audio endpoint 102. In this embodiment, loudspeaker reference signal 414 may be obtained before the signal is provided to a digital-to-analog converter (DAC) 402 for output by loudspeaker 312. With this arrangement, transmitted microphone signal 336 provided from encode/decode module 318 of first audio endpoint 102 to first remote audio endpoint 110 may have contributions from unwanted noise sources removed (e.g., echo source 332 and first noise source 334) so that first remote audio endpoint 110 receives the content of first audio input 330 from first user 302 in a clear manner.

In an example embodiment, echo at first audio endpoint 102 caused by first remote audio endpoint 110 may be suppressed using AEC module 410. In one embodiment, AEC module 410 includes second filter module 316, which may be a linear AEC portion, followed by a non-linear AEC portion (e.g., a Non-Linear Processing (NLP) module 412). Additionally, in an example embodiment, first adaptive filter module 314 may include a linear portion, without a non-linear (NLP) portion. With this configuration, the linear portion of the first adaptive filter module 314 may sufficiently attenuate background noise from co-workers and co-located audio endpoints in shared space 100 without using NLP which can cause more attenuation of microphone signal 336 that is provided to first remote audio endpoint 110 and result in a less duplex experience for telecommunication session participants.

Figure 5:
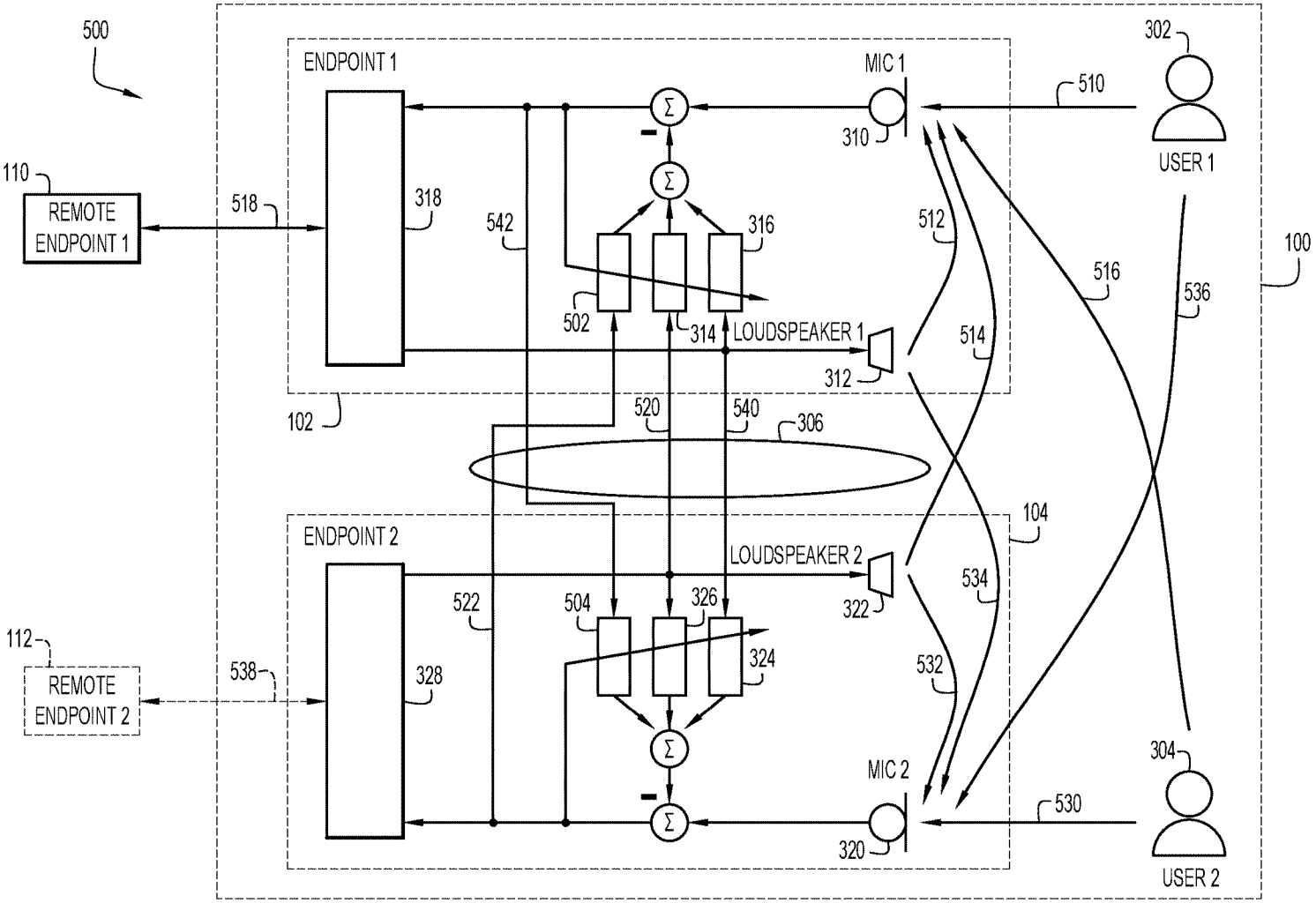
FIG. 5 is a diagram illustrating a technique for implementing adaptive noise cancellation for multiple audio endpoints in a shared space, according to another example embodiment.

In some embodiments, techniques for implementing adaptive noise cancellation for audio endpoints may further include removing a microphone reference signal from other audio endpoints in shared space 100. Referring now to FIG. 5, a technique 500 for implementing adaptive noise cancellation for multiple audio endpoints in shared space 100 is shown according to an example embodiment. In this embodiment, two audio endpoints (e.g., first audio endpoint 102 and second audio endpoint 104) are shown in acoustically shared space 100. A first user 302 is using first audio endpoint 102 to engage in a telecommunication session with a first remote audio endpoint 110. Simultaneously within shared space 100, a second user 304 is using second audio endpoint 104 to engage in a separate audio or acoustical session that is independent from the telecommunication session between first audio endpoint 102 and first remote audio endpoint 110, as detailed above with reference to FIG. 3.

Within shared space 100, first audio endpoint 102 and second audio endpoint 104 are both connected to a network (e.g., a LAN via LAN AP 120, shown in FIG. 1) to allow communication with other devices and/or participants. Additionally, as previously described above, first audio endpoint 102 and second audio endpoint 104 may be connected to each other via low-delay LAN connection 306. In this example, first audio endpoint 102 includes microphone 310, loudspeaker 312, and one or more signal processing components, including first adaptive filter 314, second adaptive filter 316, a third adaptive filter 502, and signal decoder/encoder 318. Second audio endpoint 104 has a similar configuration, including microphone 320, loudspeaker 322, and one or more signal processing components, including first adaptive filter 324, second adaptive filter 326, a third adaptive filter 504, and signal decoder/encoder 328.

Technique 500 for implementing adaptive noise cancellation for audio endpoints in shared space 100 may be described with reference to first audio endpoint 102. In this embodiment, microphone 310 of first audio endpoint 102 is receiving inputs from several different audio sources within shared space 100. For example, microphone 310 receives a first audio input 510 from first user 302 who is using first audio endpoint 102 to conduct a telecommunication session with first remote audio endpoint 110. In this example, first audio input 510 is the intended audio content that first user 302 is providing to first remote audio endpoint 110 via a transmitted microphone signal 518. Microphone 310 also picks up or receives echo and/or noise from other audio sources within shared space 100, including an echo source 512 output from loudspeaker 312 of first audio endpoint 102, a first noise source 514 output from loudspeaker 322 of second audio endpoint 104, and a second noise source 516 output from second user 304.

The example embodiments presented herein provide a technique of implementing adaptive noise cancellation to remove these additional unwanted noise sources from microphone signal 518 provided to first remote audio endpoint 110 from first audio endpoint 102. In this embodiment, first audio endpoint 102 may implement adaptive noise cancellation of first noise source 514 output from loudspeaker 322 of second audio endpoint 104 and second noise source 516 from second user 304 by obtaining from second audio endpoint 104 a loudspeaker reference signal 520 that corresponds to a signal to be output by from loudspeaker 322 and a microphone reference signal 522 that corresponds to an audio stream that is input to microphone 320 of second audio endpoint 104 (e.g., a first audio input 530 from second user 304).

In this embodiment, each of loudspeaker reference signal 520 and microphone reference signal 522 may be removed from the microphone signal associated with microphone 310 of first audio endpoint 102 using corresponding adaptive filters 314, 502. For example, first adaptive filter 314 is configured to remove loudspeaker reference signal 520 and third adaptive filter 502 is configured to remove microphone reference signal 522. As shown in FIG. 5, first audio endpoint 102 receives or obtains loudspeaker reference signal 520 and microphone reference signal 522 from second audio endpoint 104 via low-delay LAN connection 306. In this embodiment, loudspeaker reference signal 520 is the audio signal provided from signal decoder 328 of second audio endpoint 104 that is to be output from loudspeaker 322. For example, loudspeaker reference signal 520 may be based on received audio signals from second remote audio endpoint 112. Also in this embodiment, microphone reference signal 522 is the audio stream provided from microphone 320 of second audio endpoint 104 obtained from first audio input 530 provided by second user 304.

At first audio endpoint 102, loudspeaker reference signal 520 is removed from the microphone signal associated with microphone 310 of first audio endpoint 102 using first adaptive filter 314. That is, loudspeaker reference signal 520 corresponds to first noise source 514 output from loudspeaker 322 of second audio endpoint 104 and picked up by microphone 310 of first audio endpoint 102. Additionally, in the embodiment of FIG. 5, technique 500 further includes removing microphone reference signal 522 from the microphone signal associated with microphone 310 of first audio endpoint 102 using third adaptive filter 502. That is, microphone reference signal 522 corresponds to second noise source 516 from second user 304 and picked up by microphone 310 of first audio endpoint 102. With this arrangement, first adaptive filter 314 uses loudspeaker reference signal 520 to remove the contribution of first noise source 514 and third adaptive filter 502 uses microphone reference signal 522 to remove the contribution of second noise source 516 from the microphone signal associated with microphone 310 of first audio endpoint 102 before microphone signal 518 is provided or transmitted to first remote audio endpoint 110.

Additionally, in some embodiments, first audio endpoint 102 may further include second adaptive filter 316 that removes the contribution of echo source 512 from the microphone signal associated with microphone 310 of first audio endpoint 102 before microphone signal 518 is provided or transmitted to first remote audio endpoint 110.

Technique 500 for implementing adaptive noise cancellation for audio endpoints in shared space 100 may also be described with reference to second audio endpoint 104. That is, each audio endpoint in shared space 100 may implement adaptive noise cancellation to remove noise sources from the other audio endpoints within shared space 100. For example, microphone 320 of second audio endpoint 104 receives inputs from a first audio input 530 from second user 304 who is using second audio endpoint 104 to conduct a separate telecommunication or other audio/acoustical session with second remote audio endpoint 112. In this example, first audio input 530 is the intended audio content that second user 304 is providing to second remote audio endpoint 112 via a transmitted microphone signal 538. As in the previous example, microphone 320 also picks up or receives echo and/or noise from other audio sources within shared space 100, including an echo source 532 output from loudspeaker 322 of second audio endpoint 104, a first noise source 534 output from loudspeaker 312 of first audio endpoint 102, and a second noise source 536 output from first user 302.

At second audio endpoint 104, a loudspeaker reference signal 540 and a microphone reference signal 542 are provided from first audio endpoint 102 via LAN connection 306. Loudspeaker reference signal 540 corresponds to first noise source 534 output from loudspeaker 312 of first audio endpoint 102 and picked up by microphone 320 of second audio endpoint 104 and microphone reference signal 542 corresponds to second noise source 536 from first user 302 that is input to microphone 310 of first audio endpoint 102 (e.g., first audio input 510 from first user 302).

The loudspeaker reference signal 540 is removed from the microphone signal associated with microphone 320 of second audio endpoint 104 using first adaptive filter 324 and the microphone reference signal 542 is removed from the microphone signal associated with microphone 320 of second audio endpoint 104 using second adaptive filter 504. Additionally, in some embodiments, second audio endpoint 104 may further include second adaptive filter 326 that removes the contribution of echo source 532 from the microphone signal associated with microphone 320 of second audio endpoint 104 before microphone signal 538 is provided or transmitted to second remote audio endpoint 112.

Figure 6:
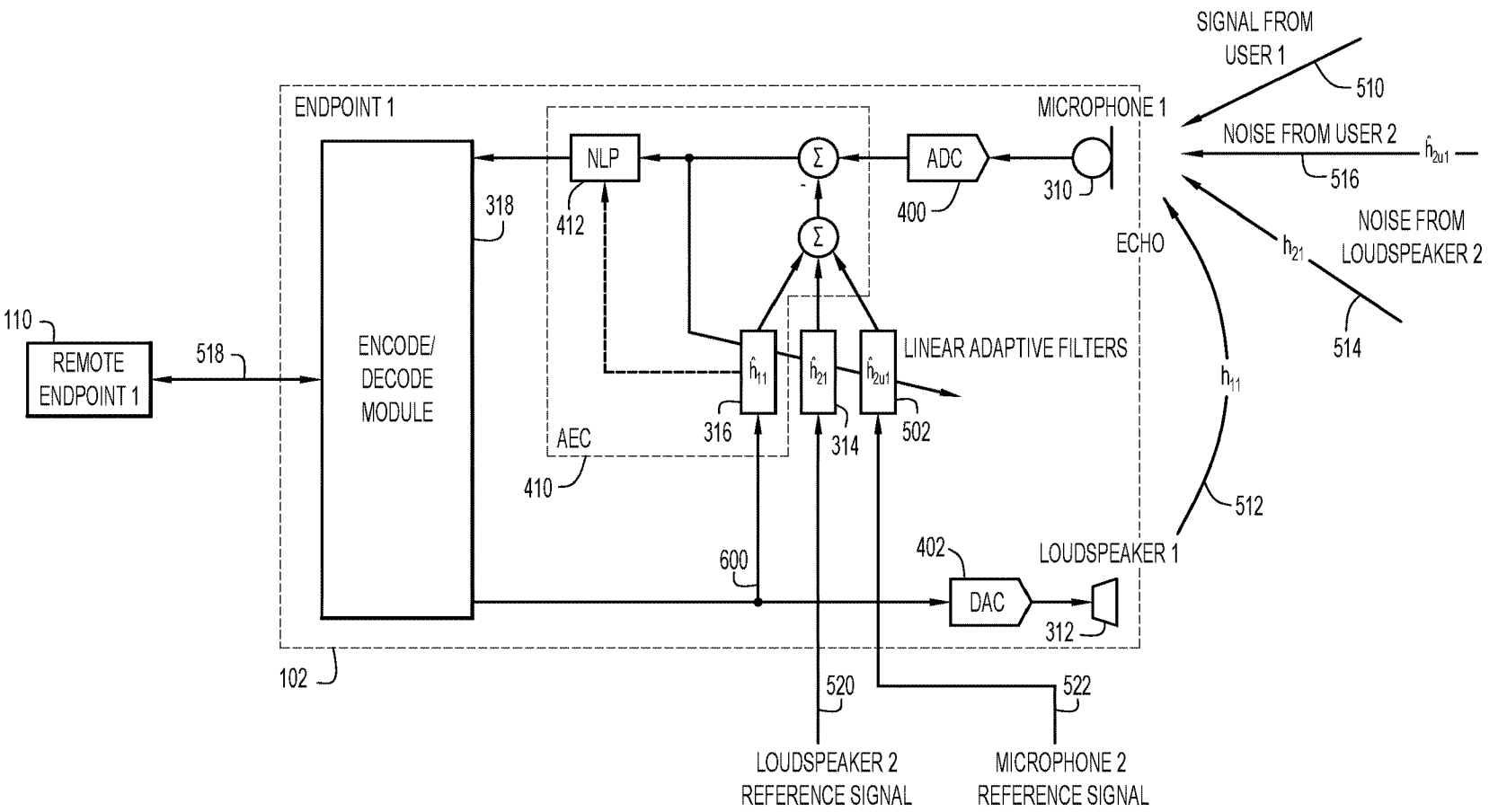
FIG. 6 is a diagram illustrating a technique for implementing adaptive noise cancellation at an audio endpoint, according to another example embodiment.

Referring now to FIG. 6, a simplified representative diagram illustrates technique 500 for implementing adaptive noise cancellation at first audio endpoint 102, according to an example embodiment. As described above, microphone 310 of first audio endpoint 102 is associated with a microphone signal that includes multiple components from different audio sources. In this embodiment, the microphone signal includes first audio input 510 from first user 302, echo source 512 ($h_{11}$) output from loudspeaker 312 of first audio endpoint 102, first noise source 514 ($h_{21}$) output from loudspeaker 322 of second audio endpoint 104, and second noise source 516 ($h_{2u1}$) output from second user 304. The microphone signal from microphone 310 is then provided to ADC 400.

As shown in FIG. 6, the digital microphone signal from ADC 400 passes to first adaptive filter module 314, which removes first noise source 514 ($h_{21}$) from the microphone signal using loudspeaker reference signal 520 that is obtained from second audio endpoint 104 via LAN connection 306. Similarly, third adaptive filter module 502 removes second noise source 516 (had) from the microphone signal using microphone reference signal 522 that is obtained from second audio endpoint 104 via LAN connection 306. Additionally, AEC module 410 may be used to remove echo source 512 ($h_{11}$), including second adaptive filter module 316 that removes echo source 512 ($h_{11}$) from the microphone signal from loudspeaker 312 of first audio endpoint 102. Second adaptive filter module 316 may remove echo source 512 using a corresponding loudspeaker reference signal (600) from loudspeaker 312 of first audio endpoint 102. In this embodiment, loudspeaker reference signal 600 may be obtained before the signal is provided to DAC 402 for output by loudspeaker 312. Additionally, AEC module 410 also includes NLP module 412 that may be used to further remove echo source 512 from the microphone signal before it is provided to encode/decode module 318. With this arrangement, transmitted microphone signal 518 provided from encode/decode module 318 of first audio endpoint 102 to first remote audio endpoint 110 may have contributions from unwanted noise sources removed (e.g., echo source 512, first noise source 514, and second noise source 516) so that first remote audio endpoint 110 receives the content of first audio input 510 from first user 302 in a clear manner.

Figure 7:
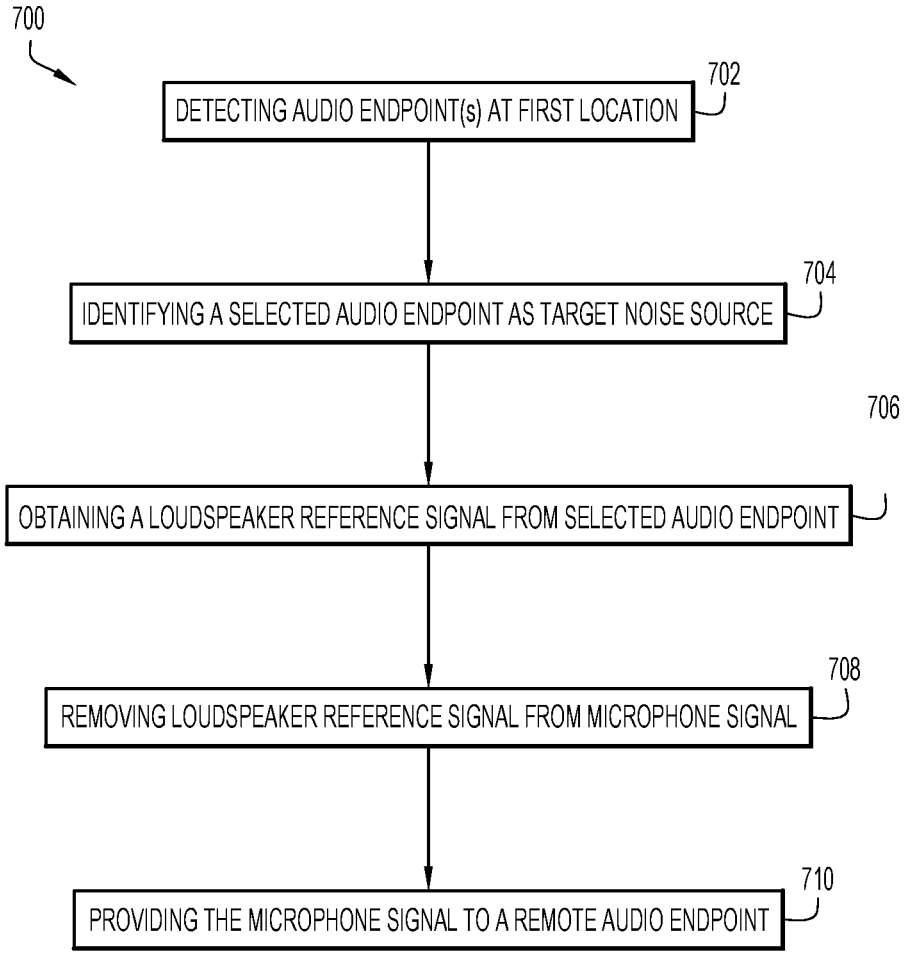
FIG. 7 is a flowchart of a method for implementing adaptive noise cancellation at an audio endpoint, according to an example embodiment.

Referring now to FIG. 7, a flowchart of a method 700 for implementing adaptive noise cancellation at an audio endpoint according to an example embodiment is illustrated. Method 700 may be implemented by one or more audio endpoints within a shared space with other audio endpoints. For example, method 700 may be implemented by first audio endpoint 102 co-located with one or more other audio endpoints within shared space 100, as described above.

In this embodiment, method 700 may begin at an operation 702 where one or more audio endpoints are detected or located at a first location. For example, first audio endpoint 102 may detect one or more of audio endpoints 104, 106, 108 within shared space 100 using ultrasonic signals, as described in reference to FIG. 2 above. Additionally, in some embodiments, detecting the audio endpoints within shared space 100 may further include located the audio endpoints relative to first audio endpoint 102, for example, using information received from ultrasonic signals, metadata, and/or a microphone array. Next, method 700 includes an operation 704 where a selected audio endpoint is identified as a target noise source. For example, first audio endpoint 102 may use method 200 to identify a selected audio endpoint as a target noise source according to the techniques described above in reference to FIG. 2.

Next, at an operation 706, a loudspeaker reference signal is obtained from the selected audio endpoint. For example, as shown in FIG. 3, first audio endpoint 102 may obtain loudspeaker reference signal 338 from second audio endpoint 104 via low-delay LAN connection 306. Upon obtaining the loudspeaker reference signal at operation 706, method 700 further includes an operation 708 where the loudspeaker reference signal is removed from the microphone signal. For example, as shown in FIG. 4, first audio endpoint 102 removes loudspeaker reference signal 338 from the microphone signal from microphone 310 before microphone signal 336 is provided to first remote audio endpoint 110.

Optionally, as described with reference to FIGS. 5 and 6 above, method 700 may also include operations (not shown) for obtaining a microphone reference signal from the selected audio endpoint and removing the microphone reference signal from the selected audio endpoint from the microphone signal before it is transmitted to a remote audio endpoint.

Additionally, method 700 may further include operations (not shown) to remove echo noise components from the microphone signal before it is transmitted. For example, using AEC module 410, including second adaptive filter 316 and/or NLP module 412 described above in reference to FIGS. 3-6.

Method 700 may end with an operation 710 where the filtered microphone signal is provided to a remote audio endpoint. For example, first audio endpoint 102 may provide or transmit microphone signal 336 that has been filtered to remove noise components to first remote audio endpoint 110.

Figure 8:
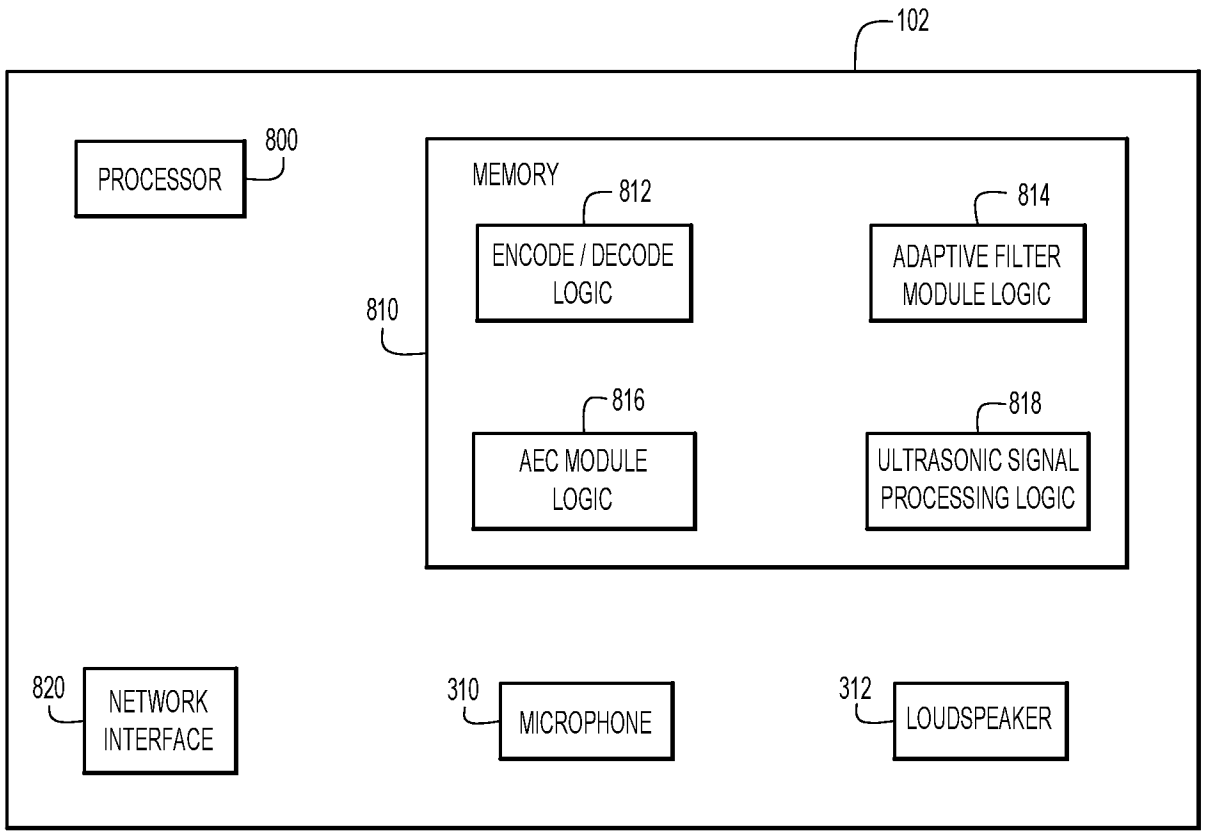
FIG. 8 is a block diagram of an audio endpoint configured to implement techniques for adaptive noise cancellation for multiple audio endpoints in a shared space, according to an example embodiment.

FIG. 8 is an electrical block diagram of first audio endpoint 102, according to an example embodiment. As described above, first audio endpoint 102 includes at least one microphone 310 and at least one loudspeaker 312. First audio endpoint 102 also includes a processor 800, a memory 810, and a network interface 820 comprising one or more ports. For simplicity, the network interface 820 and associated one or more ports may be referred to collectively as a network interface unit. Network interface 820 may be used by first audio endpoint 102 to establish a network connection via LAN AP 120 to conduct a telecommunication session with a remote audio endpoint. Network interface 820 may also be used by first audio endpoint 102 to establish a low-delay LAN connection with other audio endpoints co-located within shared space 100 (e.g., LAN connection 306). First audio endpoint 102 may also include a bus (not shown) to connect components of first audio endpoint 102, including processor 800, memory 810, network interface 820, microphone 310 and/or loudspeaker 312.

Memory 810 may include software instructions that are configured to be executed by processor 800 for providing one or more of the functions or operations of first audio endpoint 102 described above in reference to FIGS. 1-7. In this embodiment, memory 810 includes encode/decode logic 812, adaptive filter module logic 814, AEC module logic 816, and/or ultrasonic signal processing logic 818. For example, encode/decode logic 812 may be configured to provide functions associated with signal decoder/encoder 318 for first audio endpoint 102, including at least analog-to-digital and digital-to-analog conversion, as well as signal processing functions, such as transmitting and/or receiving signals. Adaptive filter module logic 814 may be configured, for example, to provide functions associated with first adaptive filter 314 for first audio endpoint 102, as well as third adaptive filter 502 in relevant embodiments, to remove the corresponding loudspeaker reference signals (in the case of first adaptive filter 314) or microphone reference signals (in the case of third adaptive filter 502).

AEC module logic 816 may be configured to provide functions associated with AEC module 410, including second adaptive filter 316 and/or NLP module 412 for first audio endpoint 102, including at least filtering of the microphone signal to remove or cancel noise sources associated with loudspeaker 312. Ultrasonic signal processing logic 818 may be configured to provide functions associated with obtaining/receiving, providing/transmitting, and processing ultrasonic signals from one or more audio endpoints, for example, as may be used by first audio endpoint 102 to locate other audio endpoints within shared space 100, as detailed in reference to FIG. 2 above.

Memory 810 may comprise read only memory (ROM), random access memory (RAM), magnetic disk storage media devices, optical storage media devices, flash memory devices, electrical, optical, or other physical/tangible (e.g., non-transitory) memory storage devices. The processor 800 is, for example, a microprocessor or microcontroller that executes instructions for operating first audio endpoint 102. Thus, in general, the memory 810 may comprise one or more tangible (non-transitory) computer readable storage media (e.g., a memory device) encoded with software comprising computer executable instructions and when the software is executed (by the processor 800), and, in particular, encode/decode logic 812, adaptive filter module logic 814, AEC module logic 816, and/or ultrasonic signal processing logic 818, it is operable to perform the operations described herein in connection with FIGS. 1-7.

It should be understood that one or more functions of processor 800, including encode/decode logic 812, adaptive filter module logic 814, AEC module logic 816, and/or ultrasonic signal processing logic 818, or other components, may be configured in separate hardware, software, or a combination of both. Additionally, processor 800 may include a plurality of processors.

In accordance with the principles described herein, the loudspeaker reference signals from other audio endpoints co-located within a shared space are pure noise sources with no contamination of the wanted or intended audio signal from a user, thereby improving performance. In contrast, using a microphone for the same purposes would degrade the adaptive noise cancellation performance because the resulting noise source would not be pure. Additionally, the techniques of the present embodiments also provide a mechanism that allows the noise signal to be obtained early in the signal processing chain to minimize delay.

The increased popularity of shared spaces and VUIs increases the occurrence of noise pollution from co-workers and other users within that shared space. The principles of the example embodiments described herein provide techniques for adaptive noise cancellation across multiple audio endpoints within a shared space to greatly reduce the amount and/or degree of unwanted background noise that is sent to far-end or remote audio endpoint participants and can also improve the performance of VUIs.

To summarize, in one form, a method is provided comprising: detecting, by a first audio endpoint, one or more audio endpoints co-located with the first audio endpoint at a first location; identifying a selected audio endpoint of the one or more audio endpoints as a target noise source; obtaining, from the selected audio endpoint, a loudspeaker reference signal associated with a loudspeaker of the selected audio endpoint; removing the loudspeaker reference signal from a microphone signal associated with a microphone of the first audio endpoint; and providing the microphone signal from the first audio endpoint to at least one of a voice user interface (VUI) or a second audio endpoint, wherein the second audio endpoint is located remotely from the first location.

In another form, an apparatus is provided comprising: a microphone; a loudspeaker; a processor in communication with the microphone and the loudspeaker, the processor configured to: detect one or more audio endpoints co-located with the apparatus at a first location; identify a selected audio endpoint of the one or more audio endpoints as a target noise source; obtain, from the selected audio endpoint, a loudspeaker reference signal associated with a loudspeaker of the selected audio endpoint; remove the loudspeaker reference signal from a microphone signal associated with the microphone; and provide the microphone signal to at least one of a voice user interface (VUI) or a remote audio endpoint, wherein the remote audio endpoint is located remotely from the first location.

In yet another form, one or more non-transitory computer readable storage media are provided that are encoded with instructions that, when executed by a processor of a first audio endpoint, cause the processor to: detect one or more audio endpoints co-located with the first audio endpoint at a first location; identify a selected audio endpoint of the one or more audio endpoints as a target noise source; obtain, from the selected audio endpoint, a loudspeaker reference signal associated with a loudspeaker of the selected audio endpoint; remove the loudspeaker reference signal from a microphone signal associated with a microphone of the first audio endpoint; and provide the microphone signal from the first audio endpoint to at least one of a voice user interface (VUI) or a second audio endpoint, wherein the second audio endpoint is located remotely from the first location.

Although the techniques are illustrated and described herein as embodied in one or more specific examples, it is nevertheless not intended to be limited to the details shown, since various modifications and structural changes may be made within the scope and range of the embodiments presented herein. In addition, various features from one of the embodiments discussed herein may be incorporated into any other embodiments. Accordingly, the appended claims should be construed broadly and in a manner consistent with the scope of the disclosure.

What is claimed is:

1. A method comprising:

detecting, by a first audio endpoint, [one or more] *a second* audio [endpoints] *endpoint* co-located with the first audio endpoint at a first location;

[identifying a selected audio endpoint of the one or more audio endpoints as a target noise source;]

obtaining, from the [selected] *second* audio endpoint, a loudspeaker reference signal associated with a loudspeaker of the [selected] *second* audio endpoint;

removing the loudspeaker reference signal from a microphone signal associated with a microphone of the first audio endpoint *to generate an adjusted microphone signal*; and providing the *adjusted* microphone signal from the first audio endpoint to [at least one of a voice user interface (VUI) or] a [second] *third* audio endpoint, wherein the [second] *third* audio endpoint is located remotely from the first location.

2. The method of claim 1, wherein detecting the [one or more] *second* audio [endpoints] *endpoint* comprises obtaining an ultrasonic signal from the [one or more] *second* audio [endpoints] *endpoint*.

3. The method of claim 1, further comprising:

removing *an* echo from the microphone signal.

4. The method of claim 1, wherein [identifying] the [selected] *second* audio endpoint *is detected* as [the] *a* target noise source [comprises] *based at least in part upon* obtaining [from the one or more audio endpoints] at least one of a decibel level, an ultrasonic receive level, *an indication of* a distance and/or *a* direction, or metadata *from the second audio endpoint*.

5. The method of claim 4, further comprising:

using a microphone array to determine [the] *a* distance *to* and/or *a* direction of the [one or more] *second* audio [endpoints] *endpoint* from the first audio endpoint [in the first location]; and using the [obtained] distance and/or direction to identify the [selected] *second* audio endpoint as the target noise source.

6. The method of claim 1, further comprising:

obtaining [an audio stream from], *from the second audio endpoint, a microphone reference signal associated with* at least one microphone [associated with] *of* the [selected] *second* audio endpoint, *wherein the microphone reference signal corresponds to an audio stream that is input to the at least one microphone, and the adjusted microphone signal is also based at least in part upon the microphone reference signal.*

[7. The method of claim 6, further comprising:

providing the audio stream as a microphone reference signal to an adaptive filter at the first audio endpoint to remove the audio stream from the microphone signal of the first audio endpoint.]

8. An apparatus comprising:

a microphone;

a loudspeaker;

a processor in communication with the microphone and the loudspeaker, the processor configured to:

detect [one or more] *an* audio [endpoints] *endpoint* co-located with the apparatus at a first location;

[identify a selected audio endpoint of the one or more audio endpoints as a target noise source;]

obtain, from the [selected] audio endpoint, a loudspeaker reference signal associated with a loudspeaker of the [selected] audio endpoint;

remove the loudspeaker reference signal from a microphone signal associated with the microphone *to generate an adjusted microphone signal*; and provide the *adjusted* microphone signal to [at least one of a voice user interface (VUI) or] a remote audio endpoint, wherein the remote audio endpoint is located remotely from the first location.

9. The apparatus of claim 8, wherein [the processor is configured to detect] the [one or more] audio [endpoints by] *endpoint is detected based at least in part upon* obtaining an ultrasonic signal from the [one or more] audio [endpoints] *endpoint*.

10. The apparatus of claim 8, wherein the processor is further configured to*:* remove *an* echo from the microphone signal.

11. The apparatus of claim 8, wherein [the processor is configured to identify] the [selected] audio endpoint *is detected* as [the] *a* target noise source [by] *based at least in part upon* obtaining [from the one or more audio endpoints] at least one of a decibel level, an ultrasonic receive level, *an indication of* a distance and/or *a* direction, or metadata *from the audio endpoint*.

12. The apparatus of claim 11, wherein the processor is further configured to:

use a microphone array to determine [the] *a* distance *to* and/or *a* direction of the [one or more] audio [endpoints] *endpoint* from the apparatus [in the first location]; and use the [obtained] distance and/or direction to identify the [selected] audio endpoint as the target noise source.

13. The apparatus of claim 8, wherein the processor is further configured to obtain [an audio stream from] *a microphone reference signal associated with* at least one microphone [associated with] *of* the [selected] audio endpoint, *wherein the microphone reference signal corresponds to an audio stream that is input to the at least one microphone, and the adjusted microphone signal is also based at least in part upon the microphone reference signal.*

[14. The apparatus of claim 13, wherein the processor is further configured to:

provide the audio stream as a microphone reference signal to an adaptive filter to remove the audio stream from the microphone signal.]

15. One or more non-transitory computer readable storage media encoded with instructions that, when executed by a processor of a first audio endpoint, cause the processor to:

detect [one or more] *a second* audio [endpoints] *endpoint* co-located with [the] *a* first audio endpoint at a first location;

[identify a selected audio endpoint of the one or more audio endpoints as a target noise source;]

obtain, from the [selected] *second* audio endpoint, a loudspeaker reference signal associated with a loudspeaker of the [selected] *second* audio endpoint;

remove the loudspeaker reference signal from a microphone signal associated with a microphone of the first audio endpoint *to generate an adjusted microphone signal*; and provide the *adjusted* microphone signal from the first audio endpoint to [at least one of a voice user interface (VUI) or] a [second] *third* audio endpoint, wherein the [second] *third* audio endpoint is located remotely from the first location.

16. The one or more non-transitory computer readable storage media of claim 15, wherein the [instructions further cause the processor to detect the one or more audio endpoints by] *second audio endpoint is detected based at least in part upon* obtaining an ultrasonic signal from the [one or more] *second* audio [endpoints] *endpoint*.

17. The one or more non-transitory computer readable storage media of claim 15, wherein the instructions further cause the processor to*:* remove *an* echo from the microphone signal.

18. The one or more non-transitory computer readable storage media of claim 15, wherein the [instructions further cause the processor to identify the selected] *second* audio endpoint *is detected* as [the] *a* target noise source [by] *based at least in part upon* obtaining [from the one or more audio endpoints] at least one of a decibel level, an ultrasonic receive level, *an indication of* a distance and/or *a* direction, or metadata *from the second audio endpoint*.

19. The one or more non-transitory computer readable storage media of claim 18, wherein the instructions further cause the processor to:

use a microphone array to determine [the] *a* distance *to* and/or *a* direction of the [one or more] *second* audio [endpoints] *endpoint* from the first audio endpoint [in the first location]; and use the [obtained] distance and/or direction to identify the [selected] *second* audio endpoint as the target noise source.

20. The one or more non-transitory computer readable storage media of claim 15, wherein the instructions further cause the processor to:

obtain [an audio stream from] *a microphone reference signal associated with* at least one microphone [associated with] *of* the [selected] *second* audio endpoint[; and provide the audio stream as a microphone reference signal to an adaptive filter to remove the audio stream from the microphone signal], *wherein the microphone reference signal corresponds to an audio stream that is input to the at least one microphone, and the adjusted microphone signal is also based at least in part upon the microphone reference signal.*

*21. The method of claim 1, wherein the first audio endpoint and the second audio endpoint are connected to a common local area network (LAN).*

*22. The method of claim 1, wherein clock synchronization is established between the first audio endpoint and the second audio endpoint.*

*23. The apparatus of claim 8, wherein the apparatus and the audio endpoint are connected to a common local area network (LAN).*

*24. The apparatus of claim 8, wherein clock synchronization is established between the apparatus and the audio endpoint.*

*25. The one or more non-transitory computer readable storage media of claim 15, wherein the first audio endpoint and the second audio endpoint are connected to a common local area network (LAN).*

*26. The one or more non-transitory computer readable storage media of claim 15, wherein clock synchronization is established between the first audio endpoint and the second audio endpoint.*

* * * * *